Feb. 20, 1934.     M. M. RANGEL     1,948,396

MACHINE FOR CRACKING OFF SHELLS OF COQUITO NUTS AND ITS SIMILARS

Filed Nov. 13, 1931     2 Sheets-Sheet 1

Mauricio M. Rangel
INVENTOR

BY Victor J. Evans & Co.
ATTORNEYS

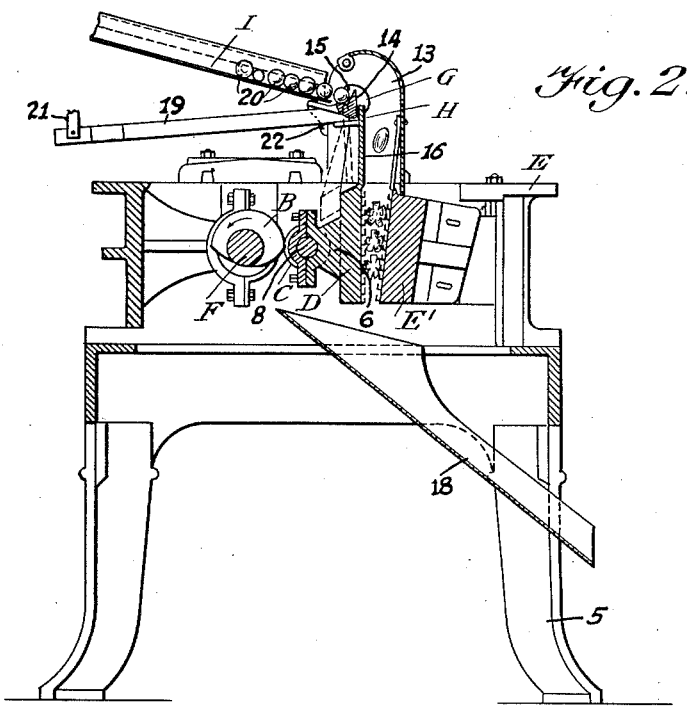
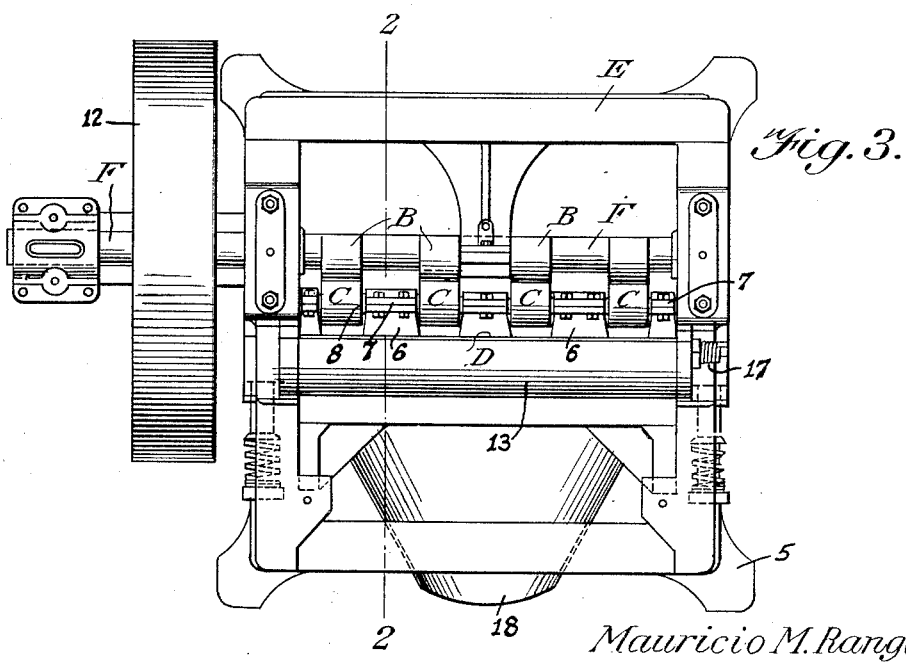

Patented Feb. 20, 1934

1,948,396

UNITED STATES PATENT OFFICE 1,948,396

MACHINE FOR CRACKING OFF SHELLS OF COQUITO NUTS AND ITS SIMILARS

Mauricio M. Rangel, Hacienda de Nogueras, Colima, Mexico

Application November 13, 1931, Serial No. 574,839, and in Mexico November 13, 1930

1 Claim. (Cl. 146—12)

This invention relates to a machine to be used for cracking off the shells of coquito nuts, known as "Coquito de Aceite (Oil's Coquito), as well as of the one called "Corozo", and of any other similar fruits, for the purpose of getting free of shell the meat contained therein. Such a machine is a different one from those known, essentially because this machine is provided with a shaft adapted to cooperate with cams or eccentrics of an irregular contour, which contour surface is in touch with rollers attached to a jaw; each roller being driven by each eccentric wheel. This motion is by reason of the irregular shape of cams or eccentrics, irregular also and discontinued, so as to permit accommodation of those fruits or objects which are to be crushed between the above mentioned moving jaw and another fastened jaw with which the machine is also provided; thus a simple mechanical movement is obtained for the above mentioned purpose, without the necessity of hand work that has been necessary up to the present time in the industry of getting the meat out of coquito nut.

In the accompanying drawings:

Figure 2 is a vertical sectional view taken approximately on the line 2—2 of Figure 3.

Figure 3 is a top plan view.

Similar reference characters indicate corresponding parts throughout the several views in the drawings.

Figure 1:
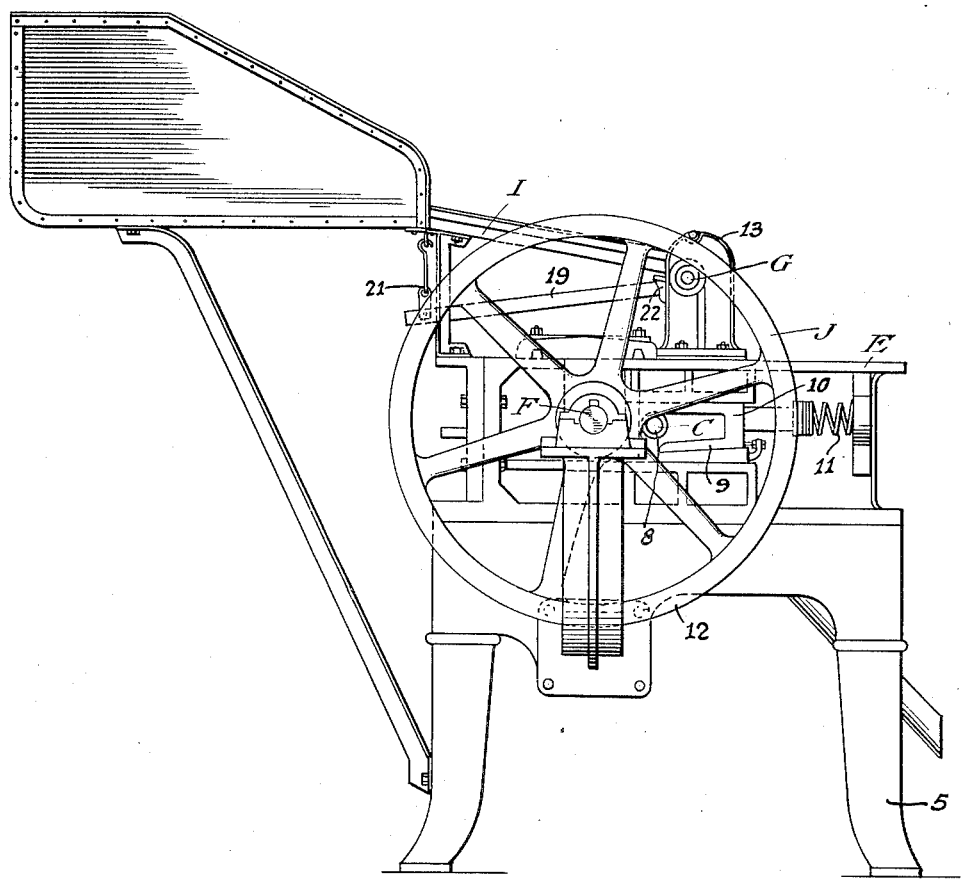
Figure 1 is a side elevation of the machine constructed in accordance with the invention.
Figure 4:
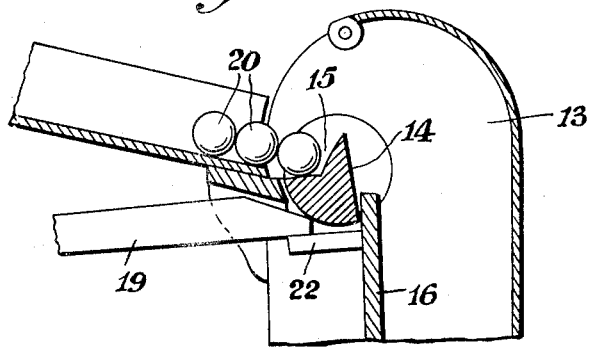
Figure 4 is an enlarged sectional view showing the feeding mechanism.

Referring to the drawings in detail, the machine comprises a stand 5 upon which is supported a frame E, the latter and said stand being preferably made from cast iron although it may be otherwise constructed. The frame has arranged therein stationary and movable jaws E' and D respectively, the movable jaw being formed with extensions 6, these being spaced apart and have detachably bolted thereon coupling plates 7 which with the extensions 6 embrace a shaft 8 disposed transversely of the frame and mounted in slides 9 at opposite ends thereof. The slides are movably fitted in guides 10 formed in opposite ends of the frame E so that the jaw D will travel back and forth in the machine. The stationary jaw E' is suitably secured in the frame E and is disposed at an angle with relation to the movable jaw D whereby the lower end will converge toward the lower end of said movable jaw. The slides 9 are each acted upon by a coiled expansion spring 11 suitably held in the frame E.

The shaft 8 has journaled thereon rollers C, these being located between the extensions 6 and against which work eccentrics B on a shaft F which is journaled transversely in the frame E. The shaft F carries a power wheel 12 of conventional type so that the said shaft can be driven from a suitable source of power. The springs 11 acting upon the slides 9 of the jaw D maintain the roller C constantly in contact with the cams B which on the working thereof imparts the back and forward movements to the jaw D as should be obvious.

Carried by and rising above the frame E is a hood 13 constituting a feed throat for directing the nuts to be cracked between the jaws E' and D so that the jaw D on motion imparted thereto will crush or break the nuts for the separation of the shells from the meat thereof.

Horizontally disposed in the hood 13 is a half-cylindrical hollow feed member 14 which has its ends journaled in the ends of the hood 13 and constitutes a gate, the hollow 15 of which is of a size to accommodate a predetermined number of nuts for delivery through the hood 13 between the jaws E' and D for the cracking or breaking of the shells thereof. The member 14 has its hollow 15 normally accessible by a feed chute I for the reception of a determined number of nuts therefrom. The jaw D is formed with an upstanding trip 16 which is designed to be active upon the member 14 to turn the same when the jaw D is moved in one direction, that is, on receding from the jaw E' so that the member will move from receiving position with relation to the chute I to delivering position with relation to the hood 13 and thus the nuts received by this member 14 will be delivered between the jaws E' and D for action thereof on the same to crack or break the shells of said nuts.

The member 14 at one end is acted upon by a spring 17 which becomes tensioned on the turning of the member 14 to receiving position with respect to the chute I so that on the approach of the jaw D to the jaw E' this member under the tension of the spring will turn to delivering position in the hood 13. When the member 14 is in delivering position it functions as a gate to the chute I to prevent further feeding of the nuts therein into the hood 13. In other words, the foremost nuts in the chute I will be gravitated into the member 14 when in receiving position and the succeeding nuts in said chute I will be cut off from the member 14 as the same is turned to delivering position with respect to the hood 13. Thus it will be apparent that an intermittent feeding action takes place in the machine of the nuts from the chute I thereof.

Below the jaws E' and D is a discharge spout 18 into which fall the nuts after the cracking or breaking of the shells thereof.

The trip 16 on the jaw D is active upon a vibrator 19 for the chute I so as to assure the positive feed of nuts 20 contained therein in the direction of the member 14, the chute I being held at a slight inclination in the direction of the member 14 as will be apparent from Figure 2 of the drawings.

The trip 16 operates against the member 14 below the axis of turning movement thereof and this trip causes the turning of said member for changing the same from receiving to delivering position. The vibrator device 19 is supported from a hanger 21 and by a lip 22 on and extending rearwardly from the said trip 16 of the jaw D. The vibrator device 19 is free for reciprocation and swinging movement corresponding to the hanger 21 therefor.

In the operation of the machine the nuts 20 will be fed into the member 14 at the hollow 15 therein and when the jaw D recedes or moves backwardly from the jaw E' the member 14 will be turned by the trip 16 to deliver the nuts transferred thereto from the chute I through the hood 13 for the falling thereof between the jaws E' and D and during the gravitation period of the nuts the jaw D will advance toward the jaw E' and in this advancement the nuts will be gripped and the shells thereof crushed or broken. When the jaw D recedes from the jaw E' the cracked or broken nuts will drop into the spout 18 for the discharge from the machine.

The jaw D is reciprocated under the action of the eccentrics or cams B working against the rollers C, these being held in constant contact with the cams or eccentrics B by the springs 11 in a manner as hereinbefore described. The abutment of the trip 16 with the member 14 controls the turning action of the member 14 and the turning of this member to delivering position is effected under the tension of the spring 17 as heretofore described.

The foregoing described operation of the machine will be continuous when power is imparted to the power wheel 12 of said machine.

Novelty of the invention

Having described my device I do consider as new, I claim as my invention the following:

A machine of the character described comprising a frame, a stationary jaw in said frame, a movable jaw in said frame and confronting the stationary jaw, the stationary jaw being inclined in the direction of the movable jaw, a hood forming a throat for delivering nuts between the jaws, a chute for feeding nuts to the hood, a receiving and delivering member arranged in the hood, a trip on the movable jaw for actuating the receiving and delivering member whereby the latter will be moved from receiving to delivering position, extensions on the movable jaw, a shaft carried by said extensions, slides fitted in the frame and receiving said shaft, rollers on the shaft, eccentrics continuously working upon said rollers, means for operating the said eccentrics, and means for tensioning the movable jaw in the direction of the eccentrics to maintain the rollers and said eccentrics at all times in contact with each other.

MAURICIO M. RANGEL.